US006705692B2

(12) United States Patent
Taneya et al.
(10) Patent No.: US 6,705,692 B2
(45) Date of Patent: Mar. 16, 2004

(54) INK JET ELEMENT SUBSTRATE AND INK JET HEAD THAT EMPLOYS THE SUBSTRATE, AND INK JET APPARATUS ON WHICH THE HEAD IS MOUNTED

(75) Inventors: Yoichi Taneya, Kanagawa-ken (JP); Hiroyuki Ishinaga, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/205,446

(22) Filed: Jul. 26, 2002

(65) Prior Publication Data

US 2002/0186280 A1 Dec. 12, 2002

Related U.S. Application Data

(62) Division of application No. 09/906,755, filed on Jul. 18, 2001, now Pat. No. 6,494,563, which is a division of application No. 09/218,626, filed on Dec. 22, 1998, now Pat. No. 6,286,927.

(30) Foreign Application Priority Data

Dec. 25, 1997 (JP) ............................................ 9-358099
Jan. 19, 1998 (JP) .......................................... 10-007709

(51) Int. Cl.[7] ......................... H04N 1/024; H04N 1/034
(52) U.S. Cl. ........................................... 347/3; 358/472
(58) Field of Search ................................ 347/3, 19, 37; 400/279, 283; 358/472

(56) References Cited

U.S. PATENT DOCUMENTS 4,339,208 A 7/1982 Biedermann ................ 400/704
4,504,880 A 3/1985 Church et al. .............. 360/113
4,550,327 A 10/1985 Miyakawa ................... 347/19
4,675,696 A 6/1987 Suzuki ........................ 347/19
4,716,421 A 12/1987 Ozawa et al. ................. 347/14
4,838,717 A 6/1989 Ogura ........................ 400/322
4,906,846 A 3/1990 Arimura ..................... 250/229
5,070,410 A 12/1991 Hadley ....................... 358/296
5,170,047 A 12/1992 Beauchamp et al. ........ 250/202
5,182,577 A 1/1993 Ishinaga et al. .............. 347/58
5,397,192 A 3/1995 Khormaee .................. 400/708
5,434,602 A 7/1995 Kaburagi et al. ....... 346/139 R
5,504,507 A 4/1996 Watrobski et al. ............ 347/19
5,534,895 A 7/1996 Lindenfelser et al. ......... 347/19
5,600,350 A 2/1997 Cobbs et al. ................. 347/19
5,684,523 A 11/1997 Satoh et al. ................ 347/247
5,841,448 A 11/1998 Moriyama et al. ............ 347/19
5,917,534 A 6/1999 Rajeswaran ................. 347/238
6,010,206 A 1/2000 Simons ....................... 347/40
6,164,748 A 12/2000 Taneya et al. ................ 347/15
6,243,109 B1 6/2001 Ishinaga et al. ............... 347/3
6,270,200 B1 8/2001 Ishinaga et al. .............. 347/65
6,290,334 B1 9/2001 Ishinaga et al. .............. 347/59
6,328,420 B1 12/2001 Koyama et al. .............. 347/45

FOREIGN PATENT DOCUMENTS

EP 0622239 11/1994
EP 631 870 A2 * 1/1995 ............. B41J/2/16
WO WO 99/15338 4/1999

* cited by examiner

*Primary Examiner*—Stephen D. Meier
*Assistant Examiner*—Blaise Mouttet
(74) *Attorney, Agent, or Firm*—Fitzpatrick, Cella, Harper & Scinto

(57) ABSTRACT

Provided is a recording head substrate on which are mounted energy generating elements that contribute to the formation of images by a recording head, and on which both light-receiving elements and light-emitting elements, or at least, light-receiving elements are mounted. In addition, provided is a recording head substrate on which are mounted energy generating elements that contribute to the formation of images by a recording head, and on which are mounted a plurality of head position detecting elements for detecting the position of the recording head.

7 Claims, 16 Drawing Sheets

INK JET ELEMENT SUBSTRATE AND INK JET HEAD THAT EMPLOYS THE SUBSTRATE, AND INK JET APPARATUS ON WHICH THE HEAD IS MOUNTED

This application is a division of application Ser. No. 09/906,755, filed Jul. 18, 2001, is now U.S. Pat. No. 6,494,563, which is a division of application Ser. No. 09/218,626 is now U.S. Pat. No. 6,286,927, filed Dec. 22, 1998.

BACKGROUND OF THE INVENTION

1. Field of the Invention

The present invention relates to an image recording apparatus in which is mounted a recording head that performs recording by ejecting (discharging) a liquid from an energy generating element or by thermal transfer.

The present invention can be applied for apparatuses, such as printers, copiers, facsimile machines for which communication systems are provided, or word processors that incorporate printers, that perform the recording of images on a recording medium, such as paper, thread, fiber, cloth, leather, metal, plastic, glass, wood or ceramics, and for industrial recording apparatuses with which various processors are combined.

"Recording" in this invention is defined not only as the formation on a recording medium of images, such as characters or drawings, that convey meaning, but also as the formation of images, such as patterns, that convey no meaning.

2. Related Background Art

Conventionally, the demand for recording apparatuses that can produce high quality images has increased, and how to improve image quality has been the subject of numerous discussions. For a recording apparatus in which a recording head is moved in one direction when recording images, the precision of the positioning of an image to be recorded is determined by the accuracy with which the recording head itself is positioned. And for the improvement of the image quality, the enhancement of the accuracy with which a recording head is positioned is an extremely important element. Therefore, in a conventional recording apparatus, for a carriage on which is mounted a recording head that records in only one direction, position detection means (e.g., an image scanner) is provided for accurately ascertaining the position of the recording head. Or, at the carriage's home position in the apparatus, optical reading means is provided to detect the position of the recording head. Then, based on the obtained head positioning data, whether the recording position is adequate or whether the recording position must be corrected is determined.

However, in a conventional recording apparatus the recording head, which constitutes the printing means, and the position detection means are arranged separately. Therefore, in a recording apparatus wherein, for example, a head position detection means is provided for a carriage, satisfactory positioning accuracy for the recording head must be obtained by mounting the recording head on the carriage. In order to obtain such accuracy, precision in the sizing of components, such as the carriage and the recording head, must be improved, or a process must be performed for correcting the positioning of the recording head.

In addition, since elements and circuits for detecting the position of the recording head must be formed on the carriage or on the substrate of the apparatus, manufacturing costs will be increased.

From the viewpoint of high quality image recording, highly delicate recording, for improved image density and tone representation, can be performed by producing dots that have variable sizes.

As the resolution of an image is increased, however, extremely high accuracy is needed to position the dots that are formed, and as the number of steps involved in varying the dot sizes is increased, greater dot size accuracy is required.

Thus, when a plurality of recording elements are employed, dot positioning errors and the use of non-uniform dot sizes can result in the deterioration of the image quality.

It is apparent that the demand for increased image quality can not be satisfied merely by improving the accuracy of the positioning of a carriage and a recording head and the accuracy in the production of dot sizes, so that accordingly, the shortcomings attributable to inaccurate dot positioning and to the unstable production of accurately sized dots are not resolved.

SUMMARY OF THE INVENTION

It is, therefore, one object of the present invention to provide at a low manufacturing cost an ink jet recording apparatus that can not only accurately detect the position of a recording head but can also accurately stabilize the positioning and the sizing of dots, a recording head therefor, and an element substrate to be used for the recording head.

To achieve the above object, according to one aspect of the present invention, provided is a recording head substrate on which are mounted energy generating elements that contribute to the formation of images by a recording head, and on which both light-receiving elements and light-emitting elements, or at least, light-receiving elements are mounted.

The light-receiving elements can be photodiodes or CCDs.

In addition, a controller for controlling the energy generating elements and the light-receiving elements is also mounted on the recording head substrate.

In this case, it is preferable that the light-receiving elements and at least one part of the controller be produced during the same manufacturing process.

The energy generating elements and the light-receiving elements are arranged along at least one line on the recording head substrate.

The energy generating elements and the light-receiving elements are arranged along a plurality of lines, and the lines are parallel to each other.

In this case, on the individual lines the number of the energy generating elements may be equal to the number of the light-receiving elements, but it is preferable that the number of the light-receiving elements be greater than the number of the energy generating elements.

According to one more aspect of the present invention, provided is a recording head comprising:

the above described recording head substrate;

a top board in which are formed liquid flow paths that correspond to the energy generating elements; and discharge orifices (port) which is communicated with the liquid flow path of the top plate and through which liquid is discharged by the application of energy by the energy generating elements, wherein the light-receiving elements and the light-emitting elements on the recording head substrate are optically opposite a face on which an image is formed by using the discharge ports.

According to the present invention, as is described above the energy generating elements and the light-receiving elements are mounted on the same substrate. Therefore, when the light-receiving elements optically detect dots formed by the energy generating elements, accurate information concerning the positioning, the sizes and the densities of the image dots can be obtained quickly. Further, since in contrast to an arrangement where the energy generating elements, the light-emitting elements and the light-receiving elements are mounted on separate substrates, the process for the formation of the individual elements can be commonly employed and no connections are required, the manufacturing cost and the size of an apparatus can be considerably reduced.

According to another aspect of the present invention, provided is a recording head substrate on are mounted energy generating elements that contribute to the formation of images by a recording head, and on which are mounted a plurality of head position detecting elements for detecting the position of the recording head.

According to an additional aspect of the present invention, a recording head, for forming images using energy generating elements, comprises:

a substrate on which are mounted not only the energy generating elements but also a head position detecting element for detecting the position of the recording head.

According to a further aspect of the present invention, a liquid recording apparatus comprises:

a recording head for forming images employing energy generating elements while moving on a line;

head position detecting elements that are provided for the recording head for detecting the position of the recording head; and a member in the recording apparatus that, in order to be detected by the head position detecting elements, is fixed opposite the head detecting element and along a track where the recording head moves.

The head position detecting elements are mounted on a substrate on which the energy generating elements are also mounted. In addition, it is preferable that, in accordance with position data for the recording head, detected by the head position detecting elements, and other recorded data, a circuit for generating signals to drive the energy generating elements, and light-receiving elements for detecting an image that is formed be mounted on the substrate on which the energy generating elements are mounted.

The head position detecting elements may be magnetic detecting elements, light-receiving elements or electric field detecting elements. The energy generating elements may be electro-thermal converting elements for heating liquid and inducing film boiling in order to discharge liquid droplets for forming images., As is described above, according to the present invention, since the energy generating elements that contribute to image recording and the elements for detecting the position of the recording head are mounted on the same substrate, the accuracy at which the position of an image can be recorded is extremely high. In addition, since using semiconductor fabrication processing at least the elements having two functions can be mounted on the same substrate at the same time, the manufacturing costs can be drastically reduced.

DETAILED DESCRIPTION OF THE PREFERRED EMBODIMENTS

The preferred embodiments of the present invention will now be described while referring to the accompanying drawings.

(First Embodiment)

Figure 1:
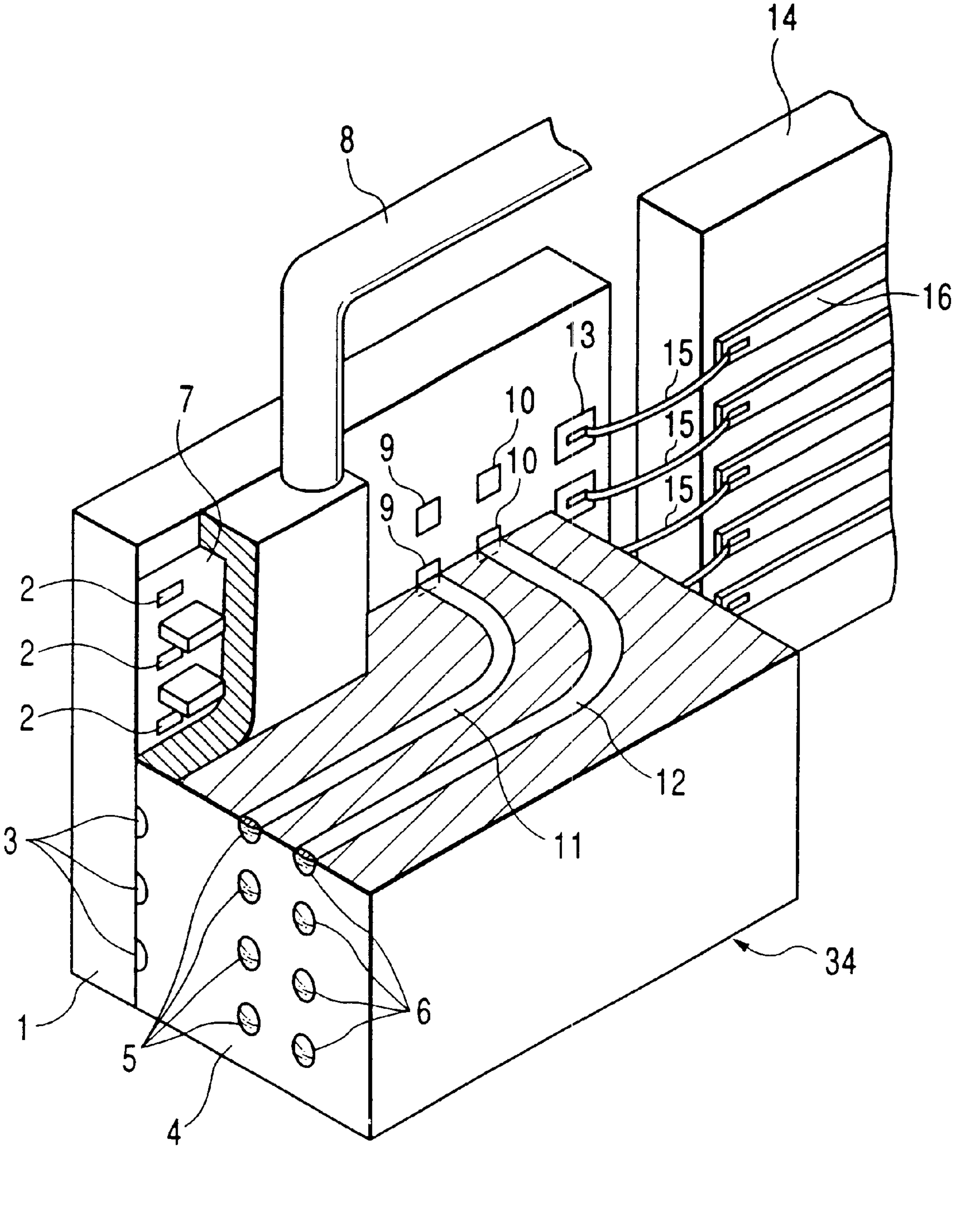
FIG. 1 is a partial cross-sectional perspective view of a recording head according to a first embodiment of the present invention that includes a substrate on which energy generating elements are mounted.
Figure 2:
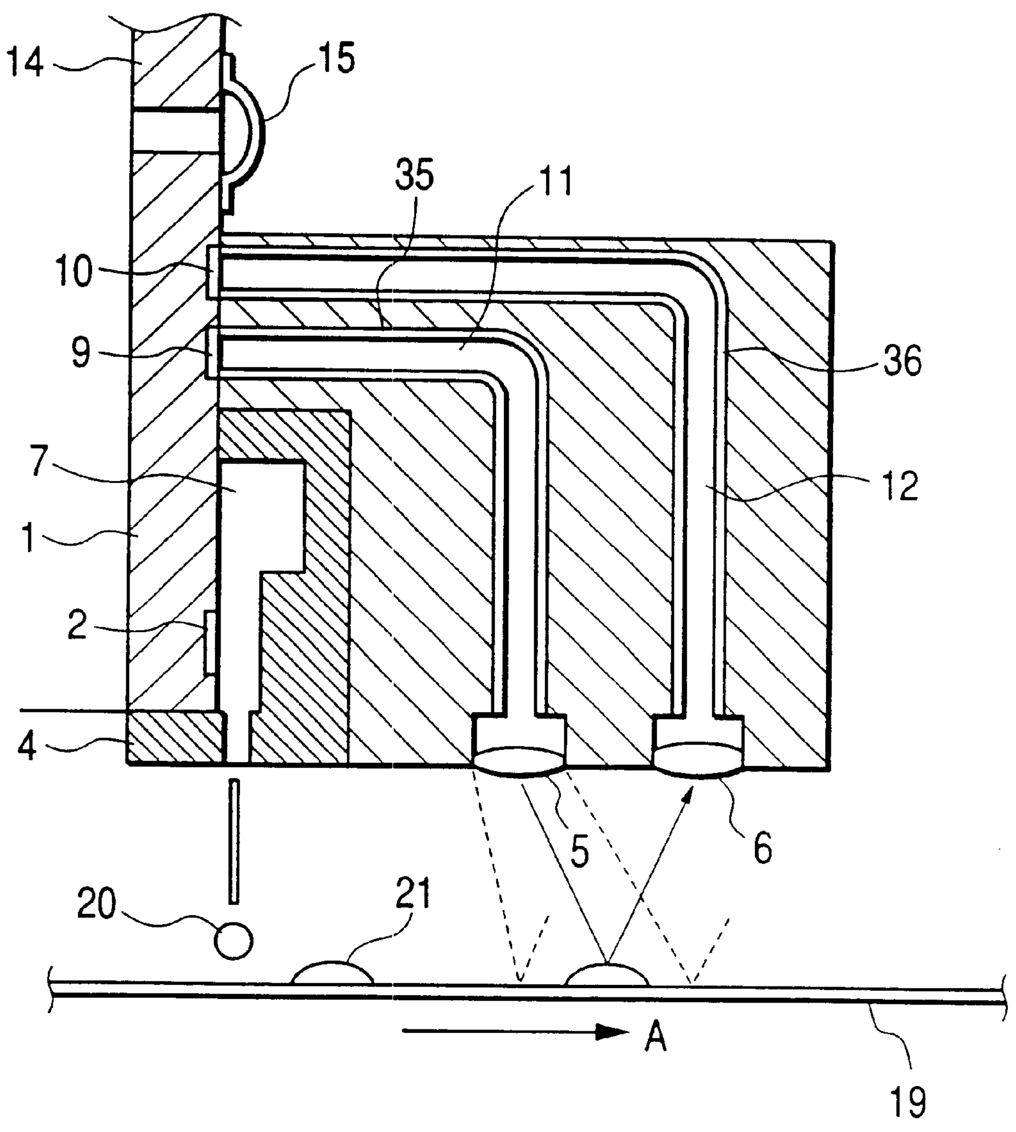
FIG. 2 is a cross-sectional view of the recording head in FIG. 1.

FIG. 1 is a partial cross-sectional perspective view of a recording head, according to a first embodiment of the present invention, that includes a substrate in which energy generating elements are formed. FIG. 2 is a cross-sectional view of the recording head shown in FIG. 1.

In this embodiment, a plurality of energy generating elements 2 are vertically arranged along the end of a substrate in order to heat liquid and to generate air bubbles for the discharge of the liquid. A top board (ceiling plate) 4 is bonded to the substrate 1, and in the top board 4 grooves are formed as liquid flow paths 7 that correspond to the energy generating elements 2. Discharge ports 3 communicate with the liquid flow paths 7 for the discharge of a liquid when the energy generating elements 2 heat and cause the liquid to foam. Liquid supply pipes 8 are provided for the supply of liquid to the liquid flow paths 7. An image is formed by expelling liquid droplets 20 through the discharge ports 3 so that they land on an image recording sheet 19. In addition to the substrate 1, another substrate 14 is provided on which are mounted wiring patterns 16, and when pads 13 on the substrate 1 are connected to the wiring patterns 16 by bonding wires 15, the energy generating elements 2, light-emitting elements 9 and light-receiving elements 10 can exchange signals with the main body of a recording apparatus.

The light-emitting elements 9 and the light-receiving elements 10 are mounted on the same substrate 1 with the energy generating elements 2 by using a semiconductor layer of the substrate 1. In this embodiment, as is shown in FIG. 1, the locations of the discharge ports 3 correspond to those of the light-emitting elements 9 and the light-receiving elements 10. However, a part of the objective of the present invention can be implemented even when the arrangements do not correspond.

When using an optical system, the light-emitting elements 9 and the light-receiving elements 10 are optically opposite the face on which an image is formed by discharge nozzles. In this embodiment, by means of optical fibers 11 and 12 and optical lenses 5 and 6, the image formation face is irradiated by the light-emitting elements 9, and light reflected from the face is transmitted to the light-receiving elements 10. As is shown in FIG. 2, the area on the image formation face that these elements can irradiate or from which they can receive light is an area adjacent to one of the image dots 21 that are relatedly scanned (in the scanning direction indicated by arrow A). Since image dots 21 are formed on the image recording sheet 19 and since a recording head 34 scans the image recording sheet 19, the relative positional relationship of the image dots 21 is shifted. As a result, the recording head 34 can irradiate or receive, by means of the optical lenses 5 and 6, light reflected from the image dots that are formed on the image recording sheet 19.

For a design where the irradiation optical lens 5 and the light-receiving optical lens 6 can cover a large area, the focusing of the optical lenses 5 and 6 need only be adjusted vertically relative to the image recording sheet 19. For a case wherein by narrowing the focus only a small area is covered in order to increase the density of an image dot relative to its size and to improve the accuracy with which the position of the image dot is detected, the optical lenses must be angled so that they focus on the same location on an image dot, as is shown in FIG. 2.

The optical fibers 11 and 12 in FIG. 2 are cylindrical and are coated with layers (materials having a refractive index that differs from that of the optical fibers 11 and 12) 35 and 36, so that light is fully reflected at the surfaces of the fibers so that there is no external light leakage. As a result, light can be transmitted to the light-receiving elements 10 with little reduction or attenuation. In addition, when light sources, such as semiconductor lasers, having a high coherence are employed as the limit-emitting elements 9, a considerable increase in the effect can be obtained.

When another type of light source, for example, a halogen light source, is employed externally instead of using the light-emitting elements 9, a part of the effect provided by the present invention can be obtained.

The light-receiving elements 10 can be, for example, photodiodes or CCDs that can perform photoelectric conversion.

Figure 3:
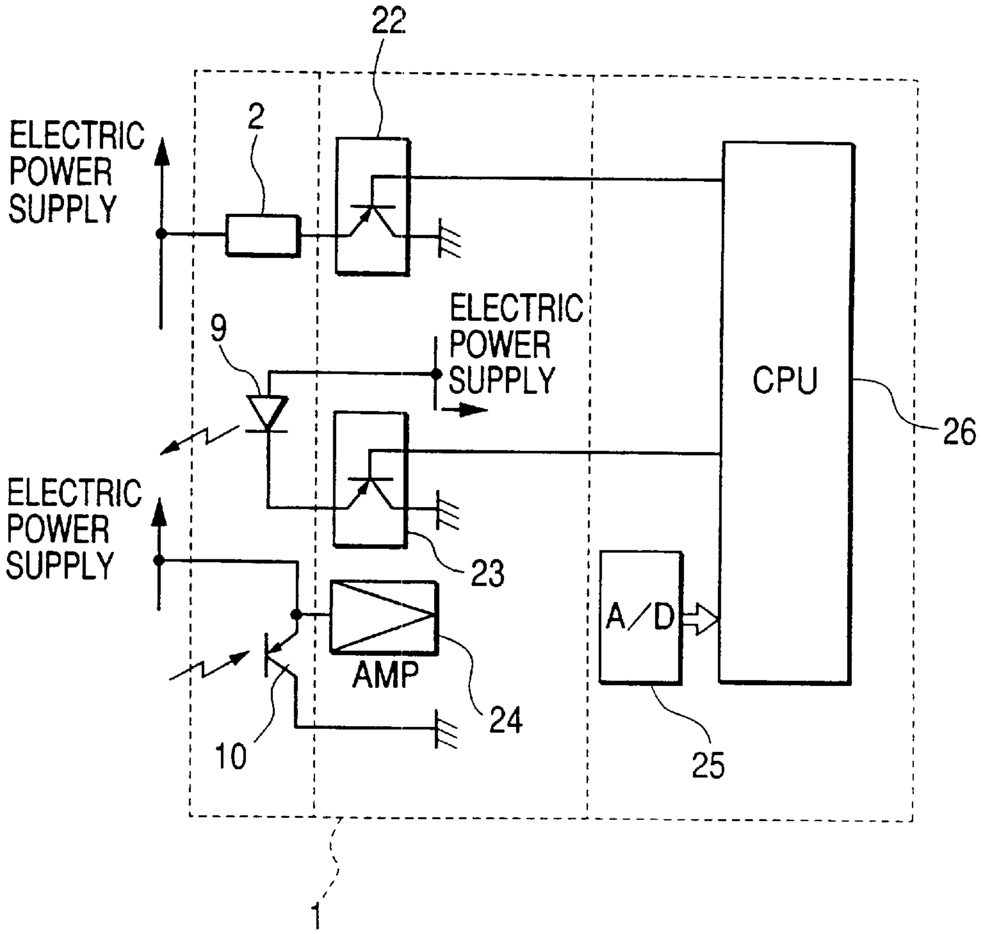
FIG. 3 is a diagram showing a driver for energy generating elements, light-emitting elements and light-receiving elements shown in FIGS. 1 and 2.

FIG. 3 is a diagram showing a driver for the energy generating elements 2, the light-emitting elements 9, and the light-receiving elements 10 shown in FIGS. 1 and 2. As is shown in FIG. 3, the energy generating element 2, the light-emitting element 9 and the light-receiving element 10 are basically driven by a CPU 26. The energy generating element 2 and the light-emitting element 9 are driven when control signals are transmitted from the CPU 26 to drivers 22 and 23. In particular, the signal of the light-receiving element 10 is amplified by an amplifier 24, and the resultant signal is converted into a digital signal by an A/D converter 25. The signal value is then transmitted to the CPU 26. The energy generating element 2, the light-emitting element 9 and the light-receiving element 10 are mounted on the same substrate by using the semiconductor layer formed on the surface. Therefore, procedures for which the same processing is used can be commonly performed and this can yield a considerable reduction in manufacturing costs, and during the semiconductor fabrication processing the adjustment of the positions of the three elements can be performed with a high level of accuracy, i.e., with a level of accuracy ranging from 1 to several μms. As a result, this arrangement effectively serves as means for making an image formation correction on the order of a μm. In addition, since the positioning relationship is fixed, a variance in the positioning of the individual elements can be detected in advance, so that the positioning of an image to be formed can be corrected accurately. Accordingly, correction control with few errors can be exercised. While the correction information may be stored in the recording apparatus, such information can be stored in nonvolatile memory that is mounted on the substrate 1, so that the accuracy of the positioning on the substrate 1 can be enhanced. When the drivers 22 and 23 for the elements are mounted on the substrate 12 by using the semiconductor layer, the previously mentioned effects, i.e., the reduction in the manufacturing costs and the improvement in accuracy, can be obtained. In addition, if an operating circuit, such as the CPU 26, is mounted on the same substrate by using the semiconductor layer, both the shape of an image and image information can be obtained at the same time, so that correction control can also be performed. As a result, high image quality control effects can be obtained.

Figure 4:
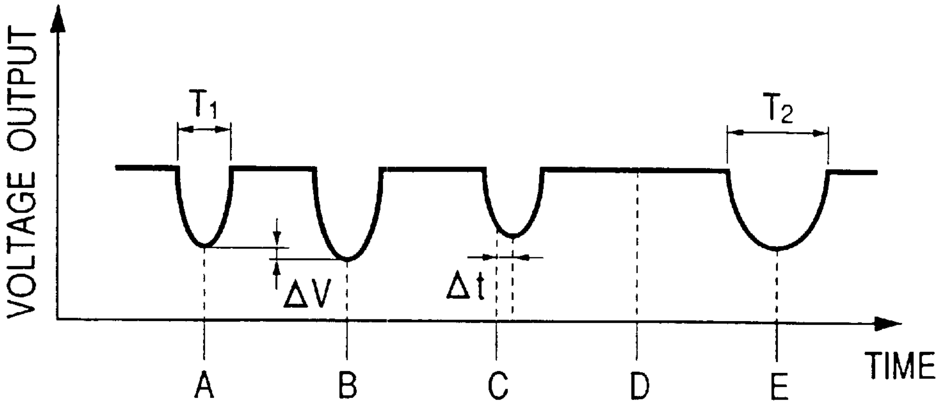
FIG. 4 is a graph for explaining a method for detecting the accuracy of the formation of image dots by the recording head according to the first embodiment of the present invention, and shows a waveform output by the light-receiving element during scanning.

An explanation will now be given, while referring to FIG. 4, for the method used for detecting the accuracy of the positioning of image dots formed on the image recording sheet 19.

As is shown in FIG. 3, while image dots 21 are being formed by the ejection through a discharge ports 3 of liquid droplets 20, the image dots 21 are being sequentially scanned by the light-emitting element 9 and the light-receiving element 10. In this case, the output by the light-receiving element 10 has the waveform shown in FIG. 4. The output of the light-receiving element 10 relative to the portion whereat the image dot 21 is formed is indicated by point A. This is because a quantity of the light that is supposed to be reflected from a sheet on which no image dots 21 are being formed is absorbed by the image dots 21, and the output is reduced. As the dot formation and scanning processes are repeated, a waveform that includes point B to point E is obtained. The output reduction level for the image dot 21 at point B is greater by ΔV than is that at point A. Therefore, it is determined that the density of the image dot 21 at point B and the light absorption rate are greater. The time interval between points B and C is greater than that between points A and B, and it is therefore determined that a shift occurred when the image dots 21 were formed, and the distance of the shift is obtained. Since there is no reduction in output at point D, it is determined that dots were not formed for a specific reason. And further, since at point E output reduction time $T_2$ is greater than is time $T_1$, it is determined that the size of the image dot is greater.

As is described above, since a variety of data concerning image dots that have been formed can be accurately obtained by a paired light-emitting element and light-receiving element, the recording head can be adequately controlled. Further, an ordinary image, such as a photo image, can be scanned by employing the light-emitting/light-receiving elements.

The overall system arrangement of the recording apparatus of the present invention will now be described, while referring to FIG. 5.

Figure 5:
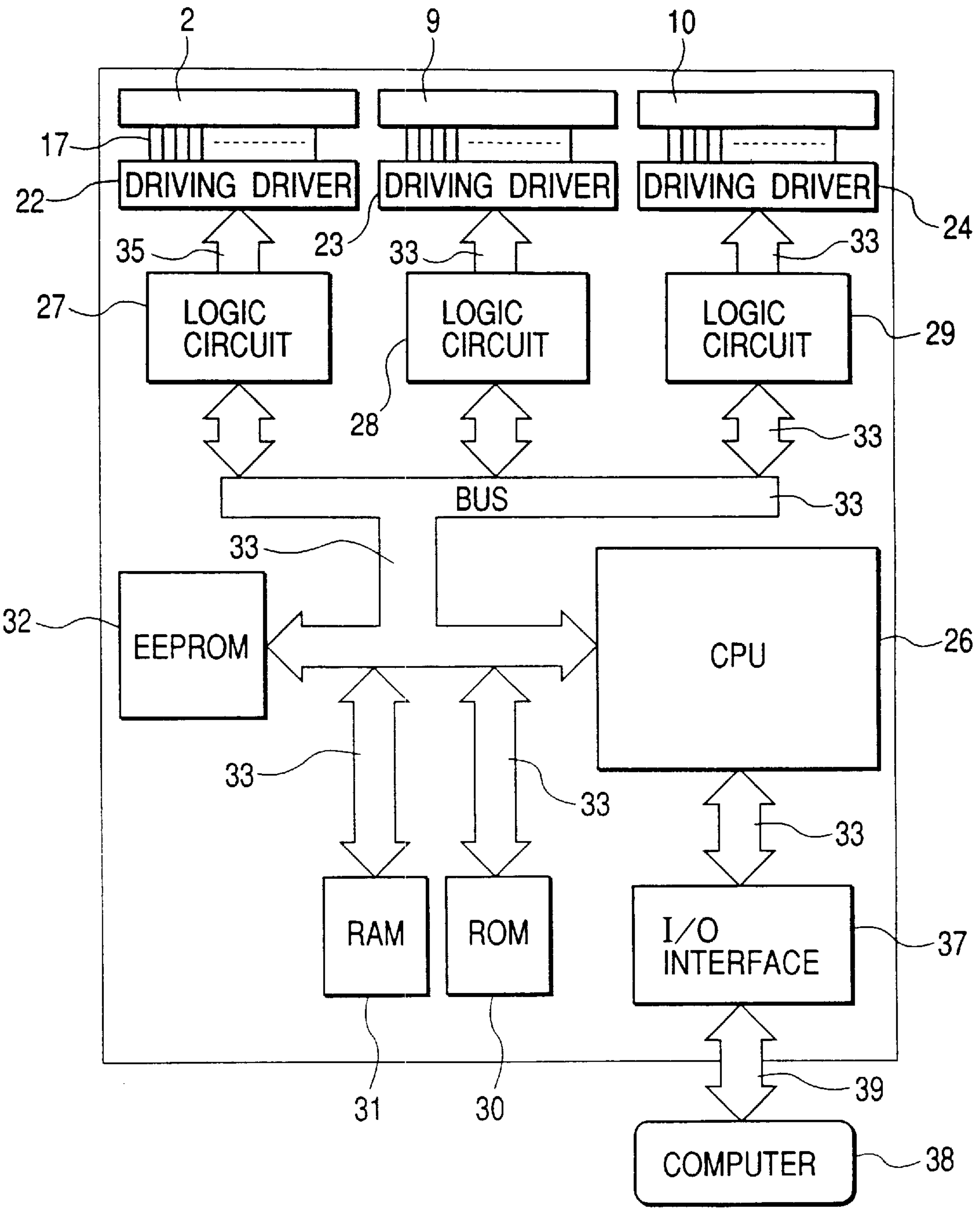
FIG. 5 is a diagram illustrating the overall arrangement of a recording system for the recording head of the present invention.

As is shown in FIG. 5, the energy generating elements 2, for forming image dots, and the driver 22 are connected by a plurality of lines 17. Similarly, the light-emitting elements 9 and the driver 23 are connected together, as are the light-receiving elements 10, an amplifier (not shown) and the driver 24. These components are connected via logic circuits 27, 28, 29 to the CPU 26. A bus 33 is used for these connections, and a RAM 31, a ROM 30 and an EEPROM 32 are connected to this bus 33. Image information provided by a computer 38 is transmitted via a data cable 39 and an I/O interface 37 to the CPU 26, and is temporarily stored in the RAM 31. Position information for the individual elements is stored in the EEPROM 32.

(Second Embodiment)

Figure 6:
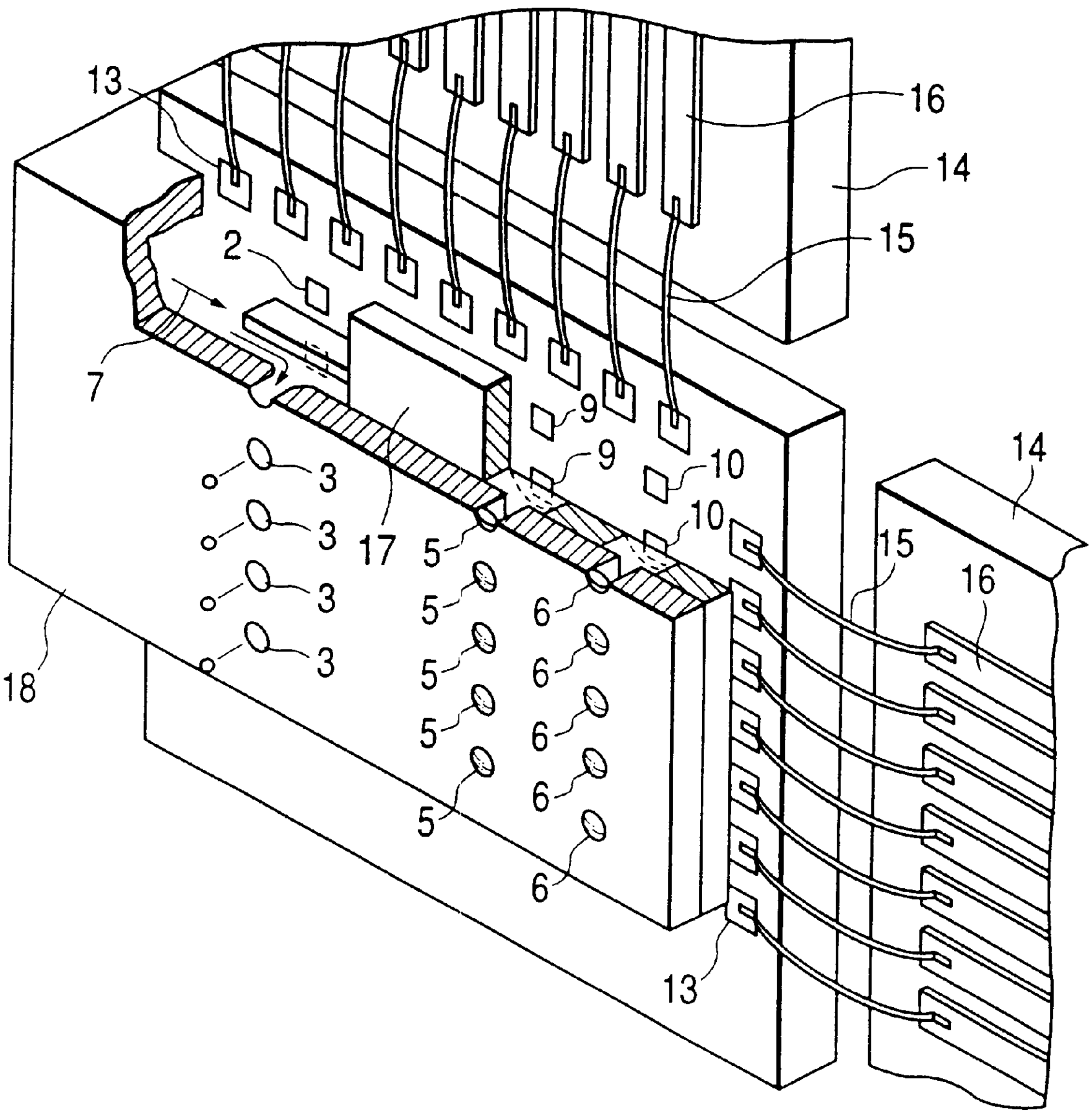
FIG. 6 is a partial cross-sectional perspective view of a recording head according to a second embodiment of the present invention that includes a substrate on which energy generating elements are mounted.
Figure 7:
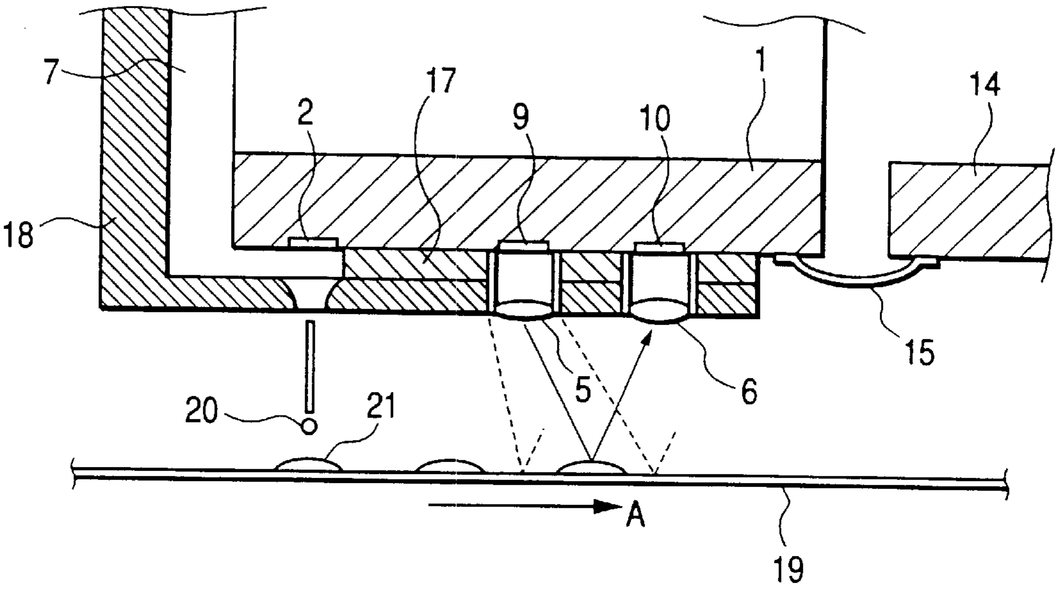
FIG. 7 is a cross-sectional view of the recording head in FIG. 6.

In a second embodiment, an explanation will be given for a case wherein the above described optical fibers are not employed. FIG. 6 is a partial cross-sectional perspective view of a recording head, according to the second embodiment of the present invention, that includes a substrate on which energy generating elements are mounted. FIG. 7 is a cross-sectional view of the recording head in FIG. 6. The same reference numerals as were used for the first embodiment are also used in this embodiment to denote corresponding components.

With the thus arranged recording head, as is shown in FIG. 6, energy generating elements 2 are arranged in a single row on a substrate 1, and light-emitting elements 9 and light-receiving elements 10 are mounted on the same substrate 1 at locations corresponding to those of the energy generating elements 2. Therefore, relative to the energy generating elements 2, the light-emitting elements 9 and the light-receiving elements 10 are arranged in single rows and are aligned in a scanning direction (a direction in which an image recording sheet is scanned or in which a recording head scans it), and these rows are parallel to the row of individual energy generating elements 2. In addition, a controller (see FIGS. 3 and 5) for driving the energy generating elements 2, the light-emitting elements 9 and the light-receiving elements 10 is also mounted on the same substrate 14. This arrangement is the same as that in the first embodiment.

In the second embodiment, a separating plate 17 is bonded to the substrate 1 to completely separate the light-emitting elements 9 and the light-receiving elements 10 from the energy generating elements 2. Further, a top board 18 is bonded to the substrate 1 with the separating plate 17 in between to cover the energy generating elements 2, the light-emitting elements 9 and the light-receiving elements 10. Then, between the top board 18 and the face of the substrate on which the energy generating elements 2 are positioned, space is defined that is used for liquid flow paths 7, and space is also defined between the top board 18 and the face of the substrate on which the light-emitting elements 9 and the light-receiving elements 10 are formed. Discharge ports 3 are formed in the portions of the top board 18 that are opposite the individual energy generating elements 2, so that liquid droplets can be ejected through the discharge ports 3 to form image dots. In addition, irradiating optical lenses 5 and light-receiving lenses 6 are formed at positions in the top board 18 that are opposite the light-emitting elements 9 and the light-receiving elements 10.

The arrangement in the second embodiment for which no optical fibers are used is simpler than is that in the first embodiment. The other actions and effects are the same as those in the first embodiment.

(Third Embodiment)

The present invention can be so modified that to detect the position of a single dot a plurality of light-receiving elements can be provided for one light-emitting element.

Such an example arrangement will now be described as a third embodiment while referring to the drawings.

Figure 8:
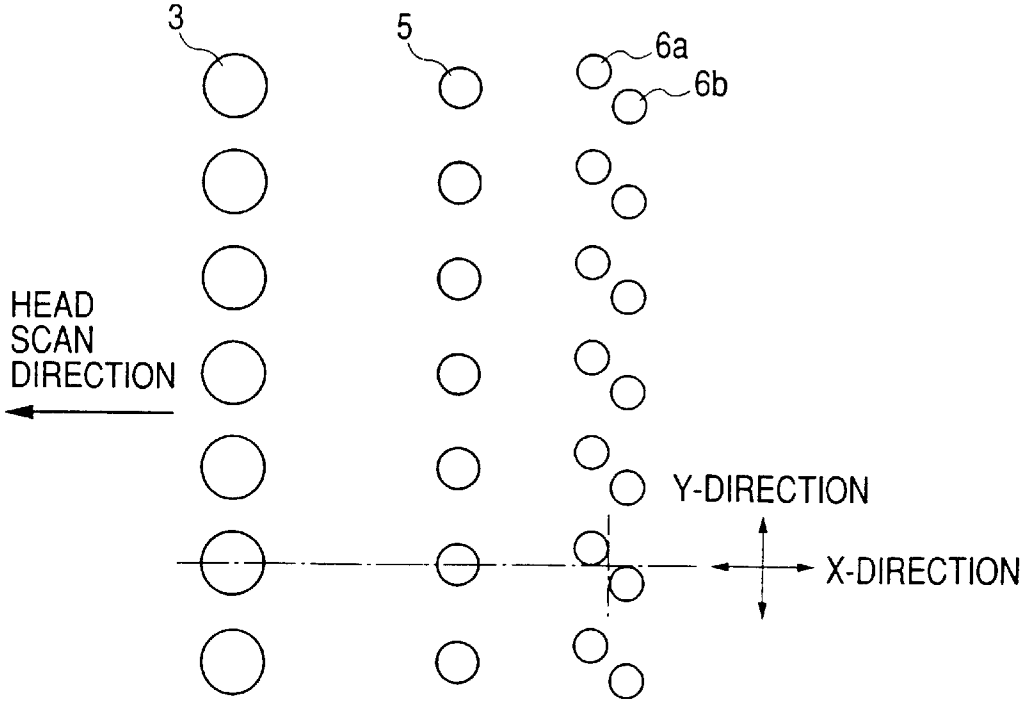
FIG. 8 is a schematic diagram for a third embodiment of the present invention.

FIG. 8 is a schematic diagram showing, in a view taken from the discharge port side of a recording head, one part of an example arrangement of discharge ports 3, irradiating optical lenses (hereinafter referred to as light emitting elements) 5, and light-receiving lenses (hereinafter referred to as first light-receiving elements 6*a* and second light-receiving elements 6*b*) 6.

As is shown in FIG. 8, light-emitting elements 5 are arranged, in a number equivalent to the number of discharge ports 3, along the scanning direction of a recording head and at a predetermined distance from the discharge ports 3. Thereafter, the first light-receiving elements 6*a* and the second light-receiving elements 6*b* are arranged at a distance from the light-emitting elements 5. When the scanning direction of the recording head is direction X, and the direction perpendicular to the scanning direction is direction Y, the first and the second light-receiving elements 6*a* and 6*b* are shifted away from the center line of the discharge port 3 in directions X and Y.

The dot detection processing performed by the thus arranged light-receiving elements will now be described while referring to FIGS. 9 and 10A and 10B.

Figure 9:
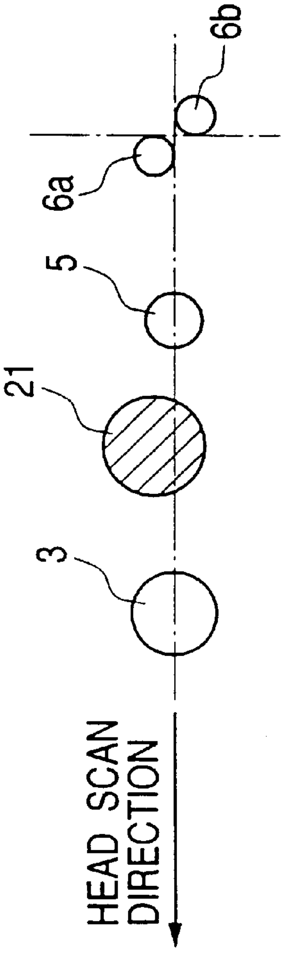
FIG. 9 is a schematic diagram for explaining the third embodiment.

FIG. 9 is a specific diagram showing the arrangement of a discharge port 3, a light-emitting element 5, and a first light-receiving element 6*a* and a second light-receiving element 6*b*, and the location whereat an ink dot 21 landed.

Figure 10A:
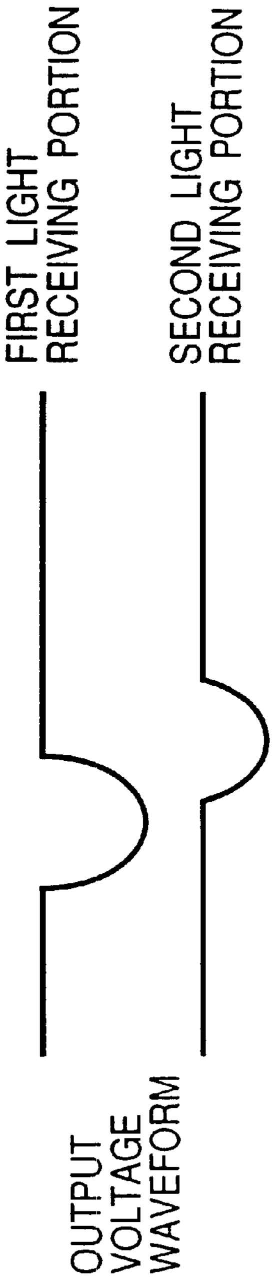
FIG. 10A is a diagram showing a detected waveform of a light-receiving element according to the third embodiment.
Figure 10B:
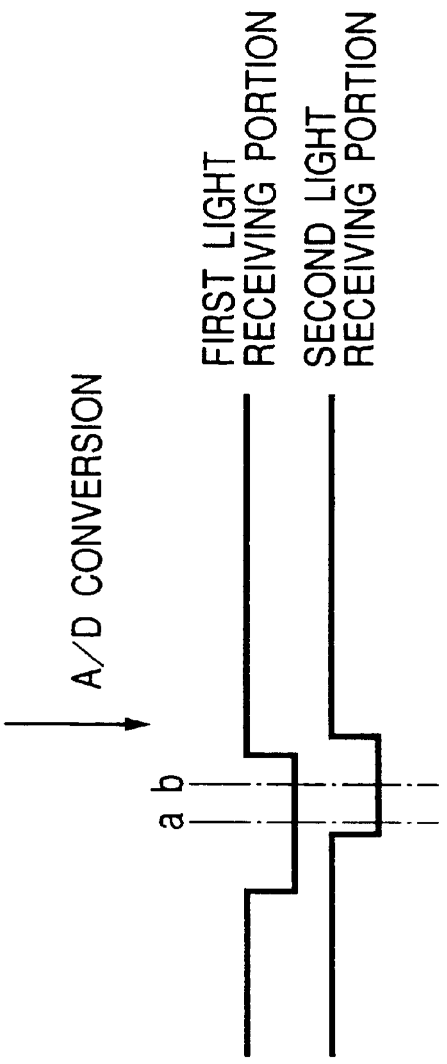
FIG. 10B is a diagram showing a waveform obtained by an A/D conversion of the detected waveform in FIG. 10A.

As is shown in FIG. 9, when the positioning of the ink dot 21 is shifted in the Y direction, as is shown in FIG. 10A, there is a large change in a voltage waveform output by the first light-receiving element 6*a*, while there is only a small change in a voltage waveform output by the second light-receiving element 6*b*. Through A/D conversion of the output voltage waveform, the pulse waveform shown in FIG. 10B is obtained.

The center (line a in FIG. 10B) of the pulse waveform detected by the first light-receiving element 6*a*, the center (line b in FIG. 10B) of the pulse waveform detected by the second light-receiving element 6*b*, and the difference between the center of the pulse waveform and the line a or the line b that should have been detected are calculated to detect the "shifting" in direction X. The discharge timing is corrected so that the line a or the line b that should actually be detected matches the center of the pulse waveform that is detected by the first or the second light-receiving element 6*a* or 6*b*. As a result, the "shifting" of a dot in direction X can be corrected. Since in this embodiment the first and the second light-receiving elements 6*a* and 6*b* are positioned at a predetermined distance in advance, the difference between the centers of the pulse waveforms is calculated to obtain a result that includes a factor for the positioning of the light-receiving element. Therefore, when the locations of the light-receiving elements in direction X are the same, the factor for the positioning of the light-receiving element does not need to be included.

In addition, with the assumption that a dot to be ejected is a circle, the difference between the pulse widths of the first and the second light-receiving elements 6*a* and 6*b* represents a positioning shift of a dot in direction Y, and a distortion of the diameter of the dot. As a result, the "shifting" of the dot in direction Y and the "distortion" of the diameter of the dot can be obtained. Thereafter, a voltage is applied to the energy generating element so that the pulse width of the first light-receiving element 6*a* matches the pulse width of the second light-receiving element 6*b*. The "distortion" of the diameter of the dot can then be corrected.

The above arrangement is only an example, and another arrangement that can detect and correct the positioning of a dot may be employed. A plurality of light-emitting elements may also be provided so that they are paired with the light-receiving elements in the above arrangement.

With this arrangement, compared with a case wherein a like number of energy generating elements and light-receiving elements are provided, the "shift" of the dot in directions X and Y, and the "distortion" of the diameter of the dot can be detected and corrected more accurately. As a result, more delicate image recording can be implemented.

In the above embodiments, an image is formed by ejecting a liquid. However, the concept of the present invention can also be applied for image formation means, such as a thermal head, that performs a thermal transfer.

As is described above, according to the present invention, since the energy generating elements for forming image dots and the light-receiving elements for optically detecting the image dots are mounted on the same substrate, the following effects are obtained:

(1) information concerning the position, the size and the density of an image dot can be obtained accurately and quickly; and (2) compared with an arrangement where the energy-generating elements, the light-emitting elements and the light-receiving elements are mounted on separate substrates, procedures are commonly performed that use the same process to fabricate the elements, and connecting them together is not required. As a result, manufacturing costs are considerably lower, and the size of the apparatus can be reduced.

Further, when more light-receiving elements are provided than are energy generating elements, more accurate image dot information can be obtained.

Furthermore, the same method can be employed to provide accurate corrections for a plurality of heads.

The light-emitting element and the light-receiving element can serve as a scanner for reading an image, such as a common photo.

The other embodiments of the present invention will now be described.

(Fourth Embodiment)

Figure 11:
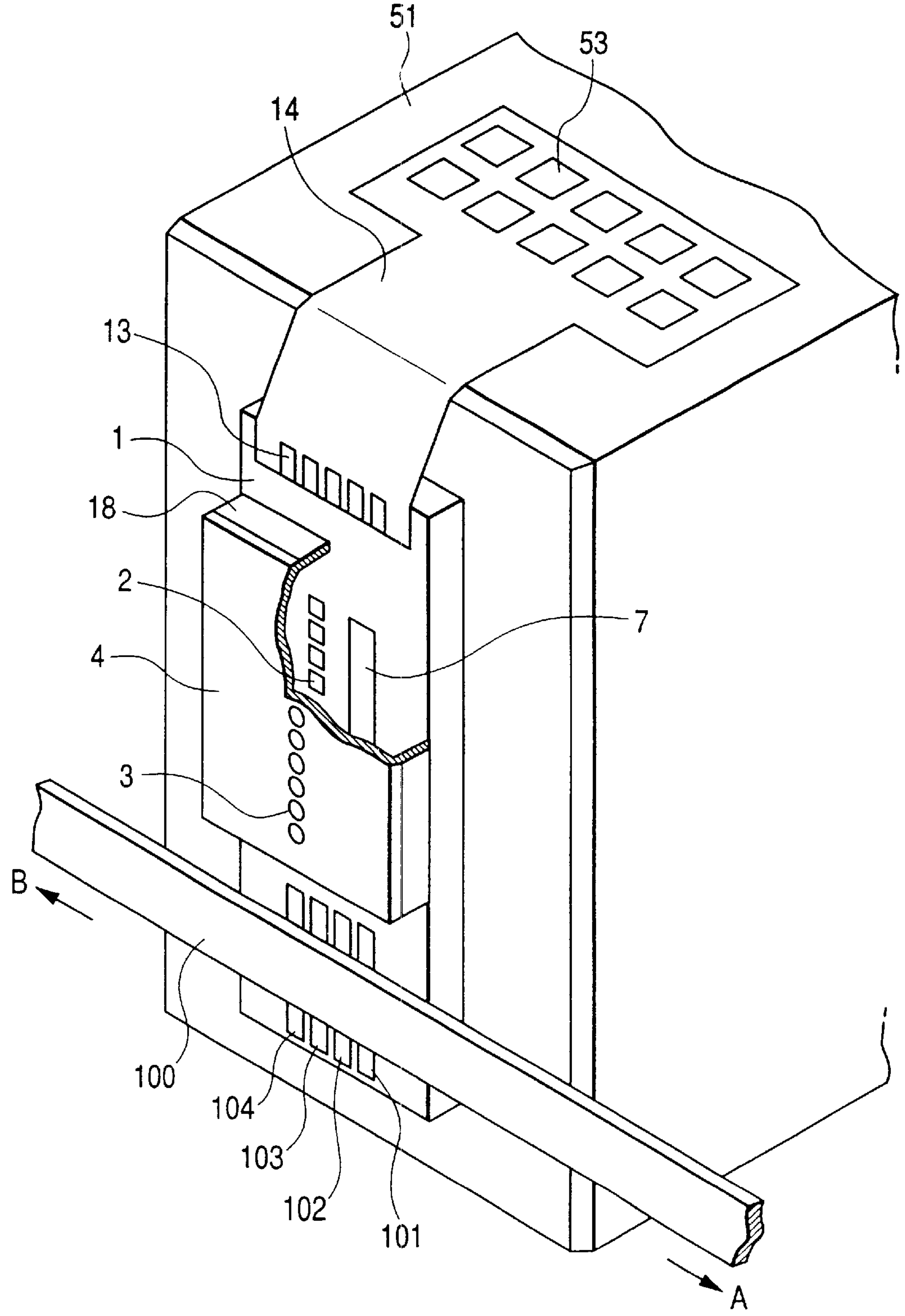
FIG. 11 is a perspective view of a recording head having a recording head substrate according to a fourth embodiment of the present invention.
Figure 12:
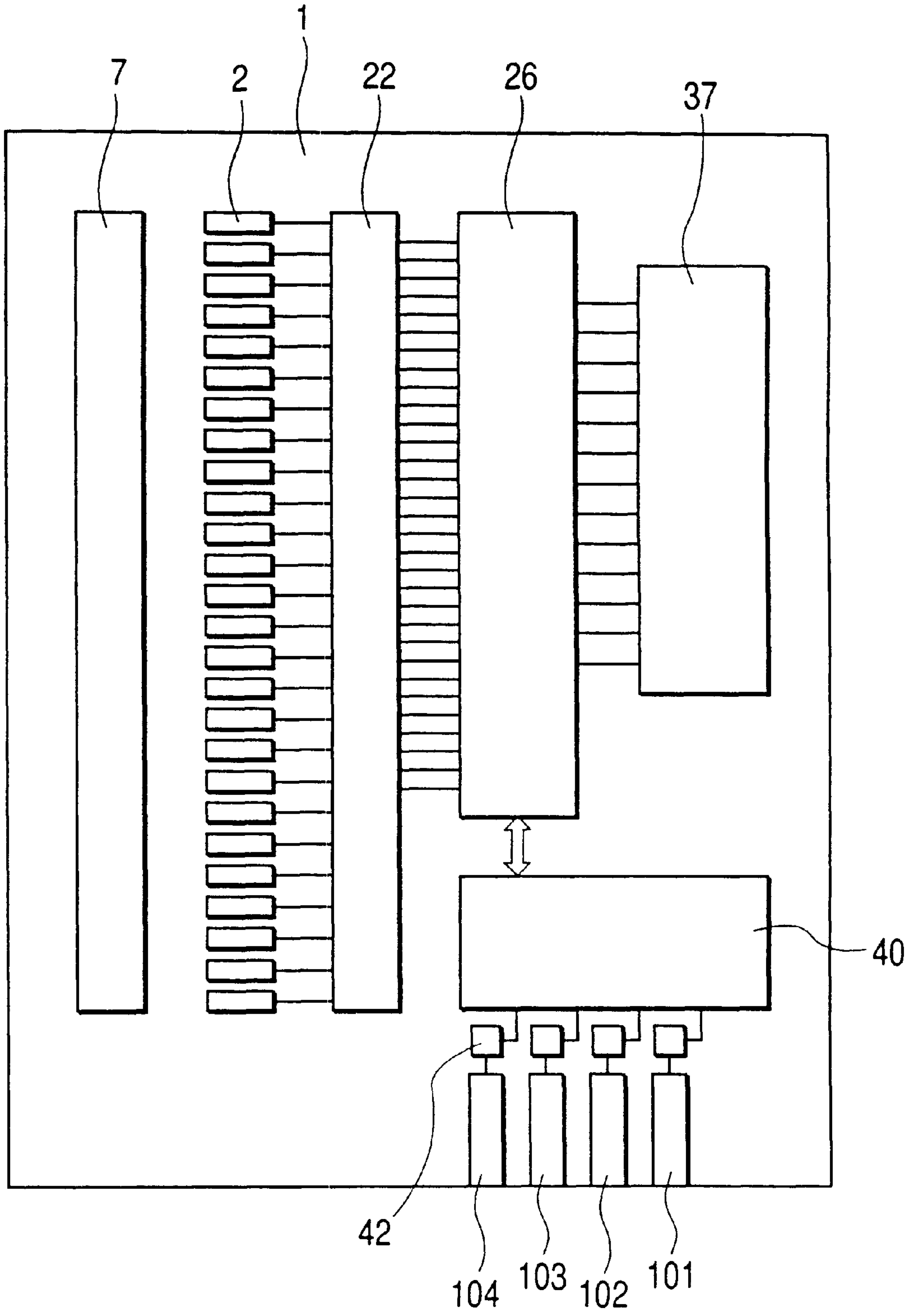
FIG. 12 is a diagram showing the arrangement of elements on the recording head substrate according to the fourth embodiment of the present invention.

FIG. 11 is a perspective view of a recording head having a recording head substrate according to a fourth embodiment of the present invention. FIG. 12 is a diagram showing the locations of elements on the recording head substrate according to the fourth embodiment.

In the recording head for this embodiment, as is shown in FIG. 11 the reverse face of a recording head substrate (hereinafter referred to as an "element substrate 1") is bonded to one face of an ink tank 51 in which ink is retained as a recording liquid. A plurality of electro-thermal converting elements 2, which serve as energy generating elements, are linearly arranged at specific pitches on the surface of the element substrate 1. A liquid supply path 7, which communicates with the ink tank 51, is formed in the vicinity of the electro-thermal converting elements 2 on the element substrate 1, and is extended in parallel with the electro-thermal converting elements 2 in the direction in which they are arranged.

A top board 4 is bonded to the element substrate 1 via a frame member 18 that encloses the electro-thermal converting elements 2 and the liquid supply path 7, and space is defined that serves as a liquid reservoir. Discharge ports 3 are formed in the portions of the top board 4 that correspond to the individual electro-thermal converting elements 2. Ink is supplied from the ink tank 51 along the liquid supply path 7 to the space that is defined by the element substrate 1, the frame member 18 and the top board 4. When the ink is heated and is brought to a boil by the electro-thermal converting element 2, pressure is generated and the ink is forced out through the discharge ports 3 onto a recording medium (not shown). In this embodiment, a so-called side shooter type is employed that discharges ink vertically relative to the element substrate 1.

Electrode pads 13 are provided on one end of the element substrate 1 for connection to a flexible print board 14. A method, such as wire bonding, is employed to connect the flexible print board 14 to the electrode pads 13. Further, contact pads 53 are located on the flexible print board 14 and serve as contact points for electrical connections between the recording apparatus and the recording head. Image shape information that includes recorded data and recording timings is exchanged via the contact points.

As the configuration feature of this embodiment, head position detecting elements 101 to 104, which are magnetic sensors, are mounted by using a semiconductor layer on the element substrate 1 on which the electro-thermal converting elements 2 are mounted. The head position detecting elements 101 to 104 are not covered by the top board 4, and are arranged in a direction perpendicular to the row of the discharge ports 3. The recording head in this embodiment can reciprocate in a direction parallel to the element substrate 1 and perpendicular to the row of discharge ports 3 (in directions indicated by arrows A and B in FIG. 11). The head position detecting elements 101 to 104 are positioned opposite, with an intervening gap, a linear magnetic member 100 (a magnetic member in which north and south polarized segments are alternately arranged linearly), which is fixed along the direction of movement of the recording head. The head position detecting elements 101 to 104, and the linear magnetic member 100 constitute the head position detection means of this embodiment. With this arrangement, the position of the recording head that moves in the direction indicated by arrow A or B in FIG. 11 can be detected when the magnetic force of the linear magnetic member 100, which is fixed to the apparatus, is detected by the head position detecting elements 101 to 104.

The element substrate 1 will be described in more detail while referring to FIG. 12.

The electro-thermal converting elements 2, which serve as energy generating elements, are rendered active by turning on or off a drive transistor (driving element) 22. The head position detecting elements 101 to 104, which are magnetic sensors, are mounted on the element substrate 1, and the semiconductor layer of the element substrate 1 can be employed as a constituent of the head position detecting elements 101 to 104. The head position detecting elements 101 to 104 output signals in accordance with the poles of the opposing linear magnetic member 100. The signals are amplified by an amplifier 42, the amplified signals are converted into digital signals by an A/D converter, and the digital signals are transmitted to a CPU 26, which is an operating circuit.

When image data are externally transmitted to the element substrate 1, they are received and processed by an I/O circuit 37 and the resultant data are transmitted to the CPU 26. The CPU 26 processes the received image signals so as to drive the energy generating elements 2 at an adequate timing, and transmits the image signals to the drive transistor 22 as drive signals. Since before the drive signals are transmitted the timing is corrected for in accordance with the position of the head that is detected by the head position detecting elements 101 to 104, an image can be recorded extremely accurately. Particularly in this embodiment, since the energy generating elements 2, which induces the recording, and the head position detecting elements 101 to 104, which detects the head position, are mounted on the same substrate, an error in the positioning of the elements amounts to only several microns, which is the patterning accuracy during semiconductor fabrication processing. As a result, extremely accurate recording can be achieved and the image quality can be drastically improved. Further, since the elements that have two separate functions are mounted on the same substrate, these elements can be fabricated at the same time during the semiconductor fabrication process and wiring is not required. As a result, the manufacturing costs can be greatly reduced.

Further, since the head position detecting elements are not covered by any member, such as the top board, a desired element type can be selected so long as it can be mounted on the recording head substrate, and the position of the head can be accurately detected at a low cost.

Figure 13:
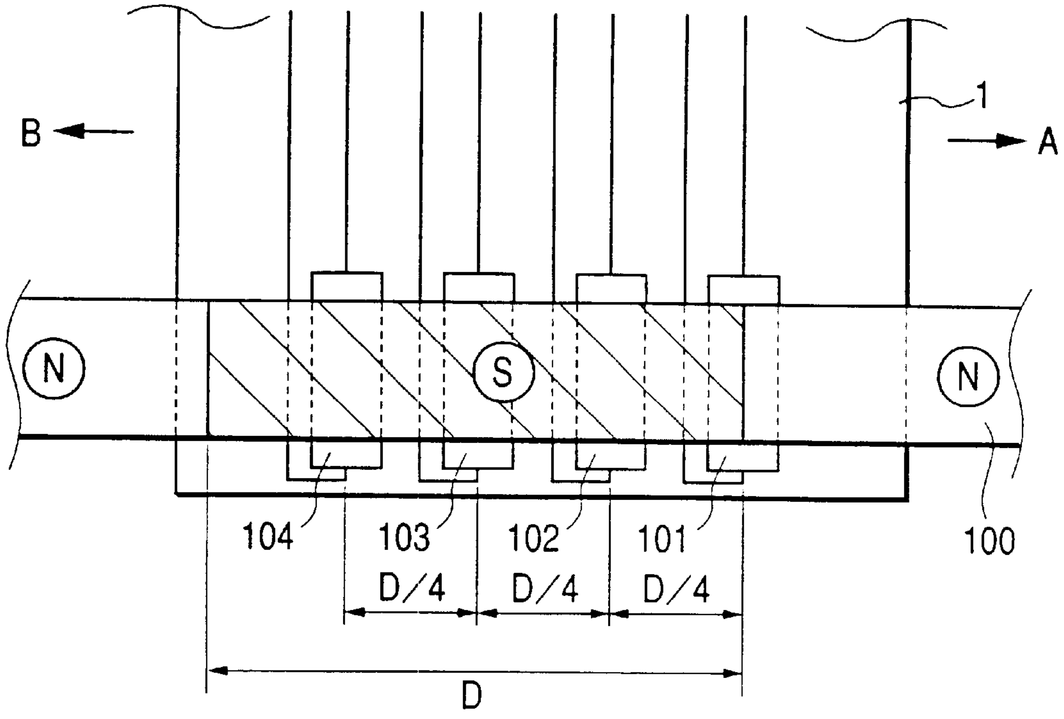
FIG. 13 is a diagram for explaining an accurate position detection method using a plurality of head position detecting elements and a linear magnetic member according to the fourth embodiment of the present invention.

An accurate method for detecting the position of a slidable recording head will now be described. FIG. 13 is a diagram for explaining the accurate position detection method, according to this embodiment, that uses the head position detecting elements 101 to 104 and the linear magnetic member 100.

In FIG. 13, the linear magnetic member 100 is magnetized at pitch D with alternate south and north polarities to form the magnetic polarity pattern. Since the head position detecting elements 101 to 104 are arranged at pitch D/4, the detection accuracy in the head moving directions A and B is D/4. That is, even if an inexpensive linear magnetic member 100 having a large pitch is employed, an extremely high detection accuracy can be obtained in consonance with the pitches and the number of the head position detecting elements 101 to 104. In addition, through more head position detecting elements are provided, the connections and the wiring for them can be performed on the same substrate. Therefore, the structure of the apparatus is not complicated, its size is not increased, and the manufacturing cost is but little increased. Since the detection accuracy is increased to pitch D/n, wherein the number of elements is n, substantially, the detection accuracy depends on the patterning accuracy attained during the semiconductor fabrication processing. Thus, a position detection is possible that is equal to or less than one micron.

(Fifth Embodiment)

Figure 14:
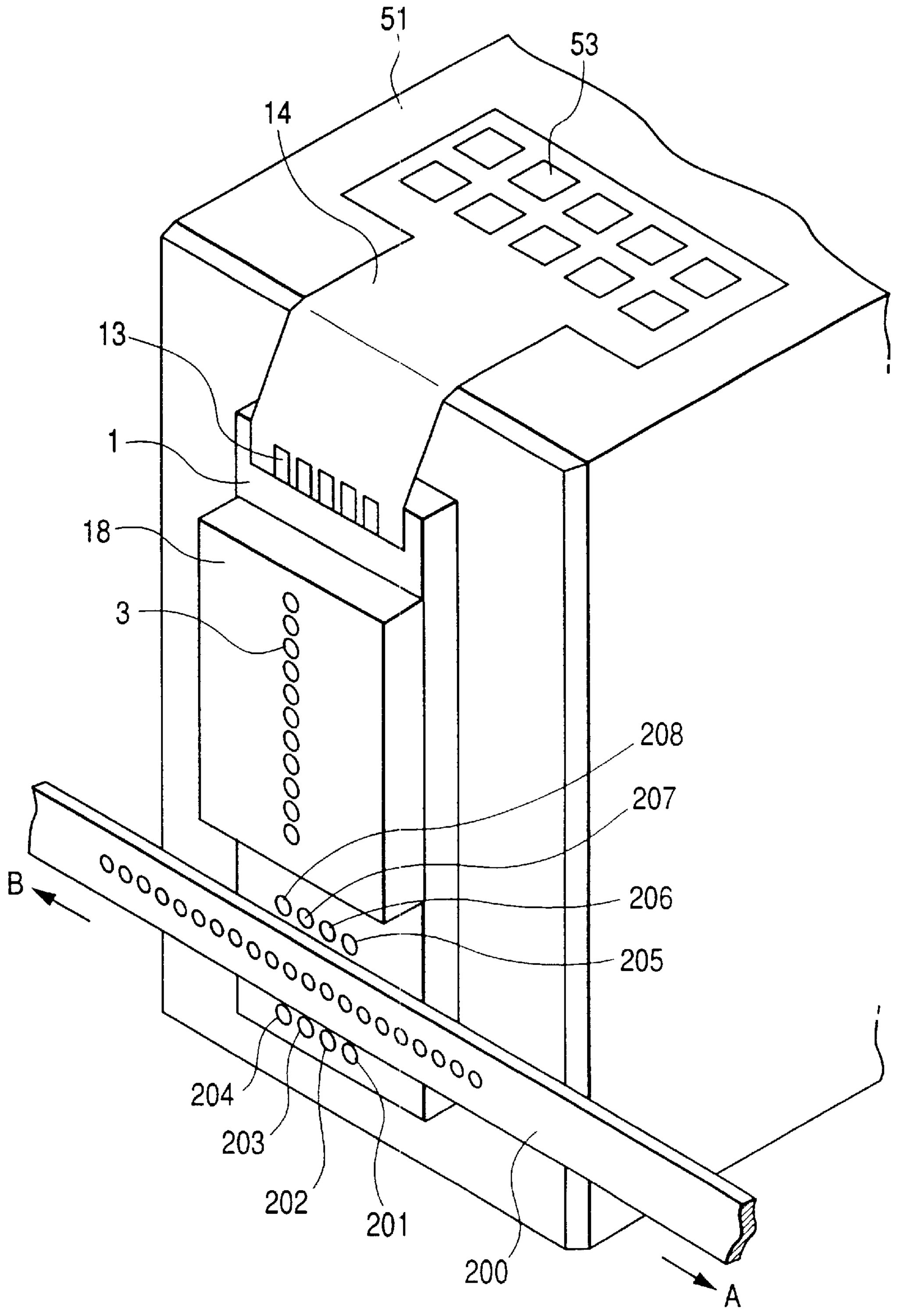
FIG. 14 is a perspective view of a recording head having a recording head substrate according to a fifth embodiment of the present invention.

FIG. 14 is a perspective view of a recording head according to a fifth embodiment of the present invention that includes a recording head substrate. The same reference numerals as were used for the fourth embodiment are also used in this embodiment to denote corresponding components. Only those portions that differ from those of the fourth embodiment will be described.

In this embodiment, as is shown in FIG. 14, optical sensors are employed as head position detecting elements. Four pairs of light-emitting elements 201 to 204 and light-receiving elements 205 to 208 are mounted with energy generating elements (electro-thermal converting elements) on an element substrate 1. The pairs of light-emitting elements 201 to 204 and light-receiving elements 205 to 208 are not covered with a top board 18, and are arranged in a direction perpendicular to a row of discharge ports 3. In addition, the recording head in this embodiment can reciprocate in directions parallel to the element substrate 1 and perpendicular to the row of discharge ports 3 (directions indicated by arrows A and B in FIG. 14). The light-emitting elements 201 to 204 and the light-receiving elements 205 to 208 are positioned opposite, with an intervening gap, a linear reflective member (a belt plate in which a reflecting portion and a non-reflecting portion are alternately arranged linearly), which is fixed along the direction in which the recording head moves. With this arrangement, for example, light from the light-emitting element 201 is reflected by the reflecting portion of the linear reflective member 200, and is transmitted to the light-receiving element 205.

Similar to the fourth embodiment in FIG. 13, the linear reflective member 200 has reflecting portions and non-reflecting portions arranged at pitches D. But in this case the four pairs of light-emitting elements 201 to 204 and light-receiving elements 205 to 208 are arranged at pitches D/4. Therefore, the four optical sensors, which are constituted by the light-emitting elements 201 to 204 and the light-receiving elements 205 to 208, can detect the position of the head in the head moving directions A and B at an accuracy of D/4. In other words, an extremely high detection accuracy can be obtained in consonance with the pitches and the number of the optical sensors that are constituted by light-emitting elements and light-receiving elements.

(Sixth Embodiment)

Figure 15:
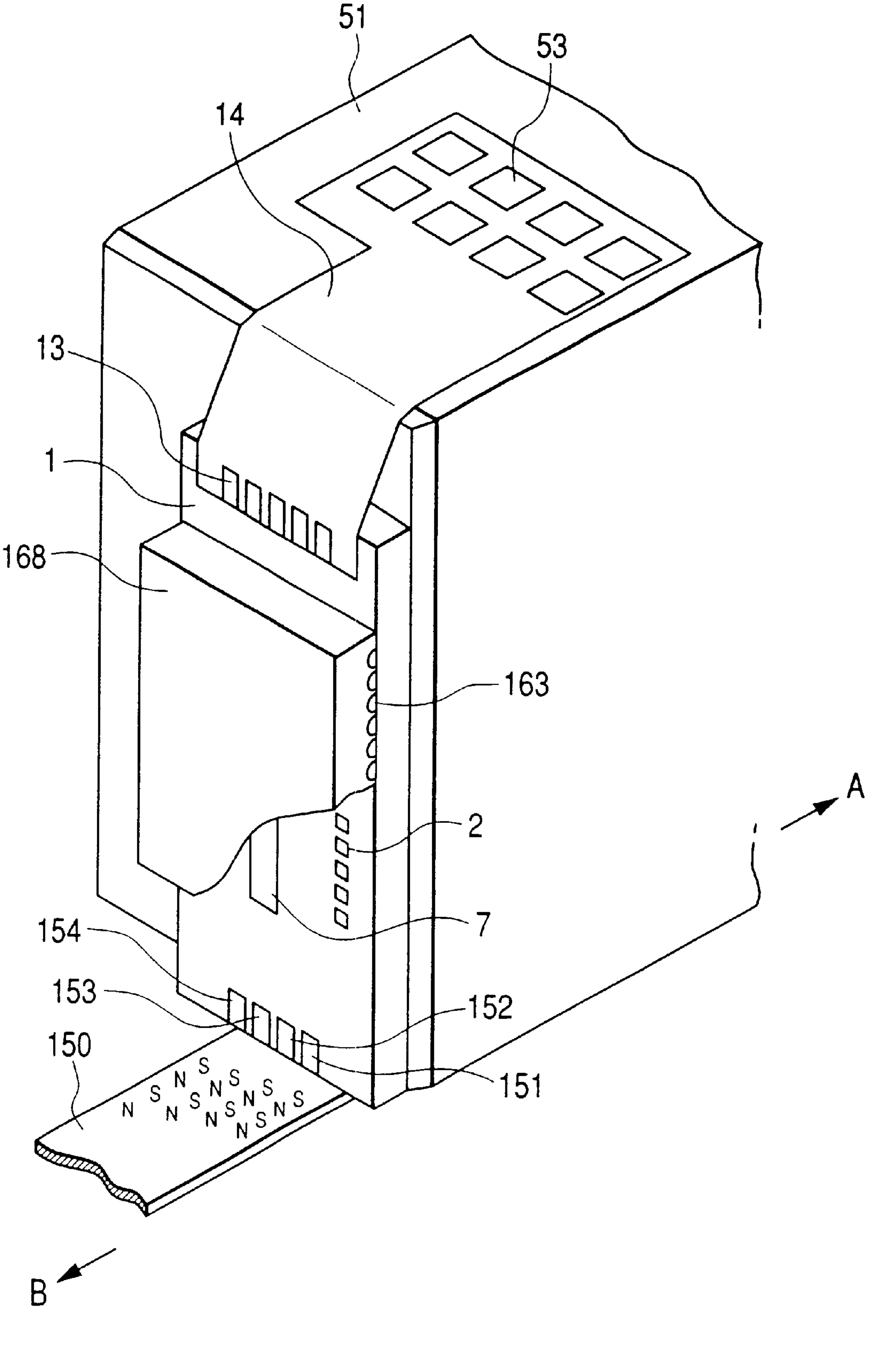
FIG. 15 is a perspective view of a recording head having a recording head substrate according to a sixth embodiment of the present invention.

FIG. 15 is a perspective view of a recording head having a recording head substrate according to a sixth embodiment of the present invention. In FIG. 15, the same reference numerals as were used for the fourth embodiment are used to denote corresponding components.

In the above embodiments, the head position detecting means of the present invention is applied for the so-called side shooter type that ejects ink vertically relative to the element substrate. In the sixth embodiment, the head position detecting means of the present invention is applied for a so-called edge shooter type.

In this embodiment, a top board 168 is bonded to the element substrate 1 on which a plurality of electro-thermal converting elements 2 are mounted, and space is defined as a liquid reservoir. In one face of the top board 168 a plurality of discharge ports 163 is formed that is parallel to the element substrate 1 and perpendicular to the row of electro-thermal converting elements 2, and at positions that correspond to the individual electro-thermal converting elements 2.

Further, head position detecting elements 151 to 154, which are magnetic sensors, are mounted by using a semiconductor layer on the element substrate 1 on which the electro-thermal converting elements 2 are mounted. The head position detecting elements 151 to 154 are not covered by the top board 168, and are arranged in a direction that is perpendicular to the row of discharge ports 163. The recording head in this embodiment can reciprocate in a vertical direction relative to the element substrate 1 and perpendicular relative to the row of discharge ports 163 (in the directions indicated by arrows A and B in FIG. 15). The head position detecting elements 151 to 154 are positioned opposite, with an intervening gap, linear magnetic members 150 (magnetic members in which north polarities and south polarities are alternately arranged linearly), which are fixed along the direction in which the recording head moves. The other arrangements are the same as those in the fourth embodiment.

Figure 16:
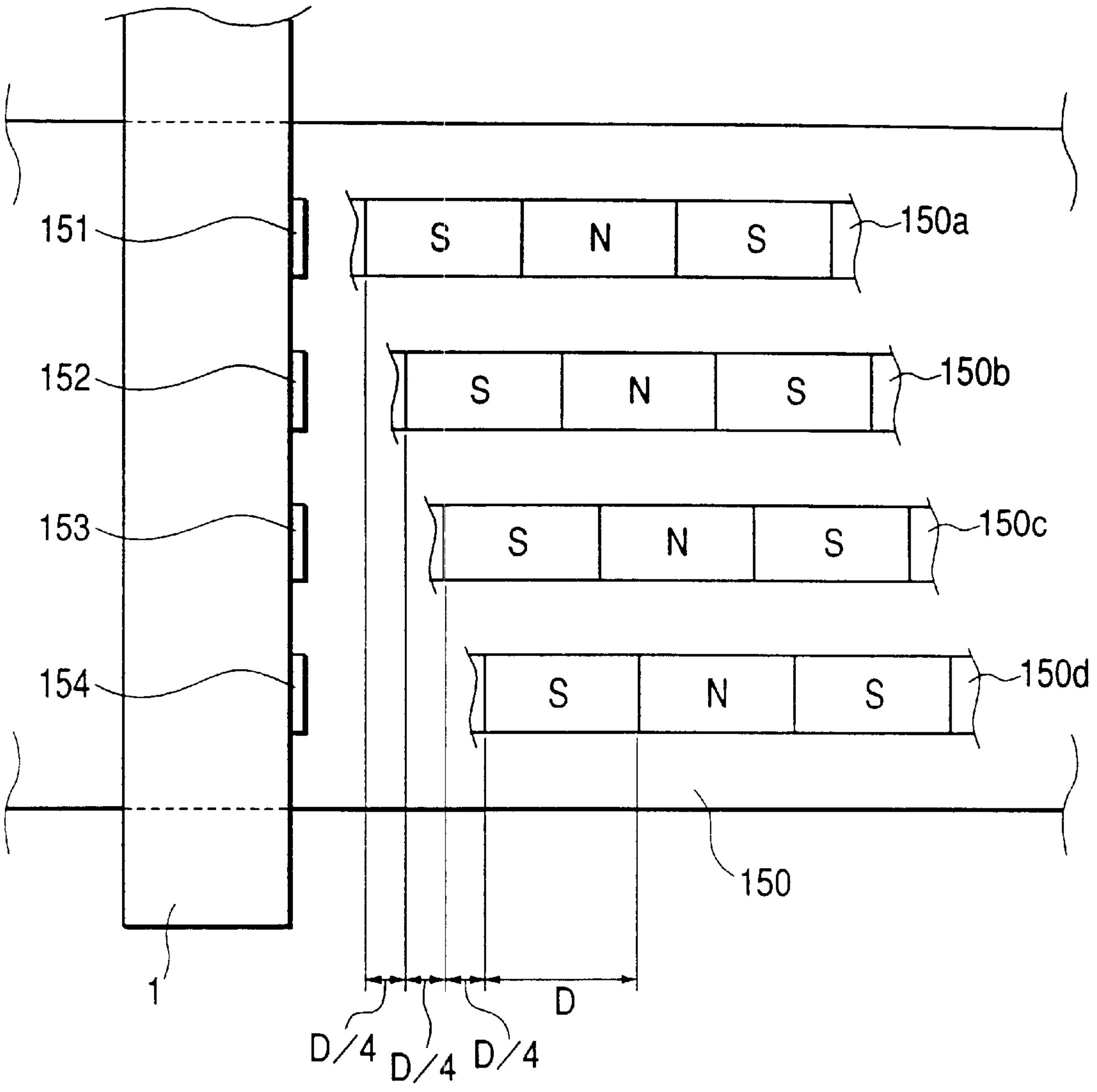
FIG. 16 is a diagram for explaining accurate position detection method using a plurality of head position detecting elements and linear magnetic members according to the sixth embodiment of the present invention.

FIG. 16 is a diagram for explaining the accurate position detection method, according to this embodiment, that uses the head position detecting elements 151 to 154 and the linear magnetic members 150.

As is shown in FIG. 16, four magnetic pole patterns 150*a* to 150*d* that correspond to the head position detecting elements 151 to 154 are provided for the linear magnetic members 150. The magnetic pole patterns are magnetized at pitches D with south and north polarities. The magnetic polarity patterns 150*a* and 150*b* are magnetized while being shifted pitches D/4, the magnetic pole patterns 150*c* and 150*d* are magnetized while being shifted pitches D/4, and the magnetic pole patterns 150*d* and 150*a* are magnetized while being shifted pitches D/4. Therefore, the detection accuracy of the head position detecting elements 151 to 154 in the head moving directions A and B is D/4. That is, an extremely high detection accuracy can be obtained in consonance with the number of head position detecting elements and the pitches for the head position detecting elements, and corresponding magnetic pole patterns.

(Seventh Embodiment)

Figure 17:
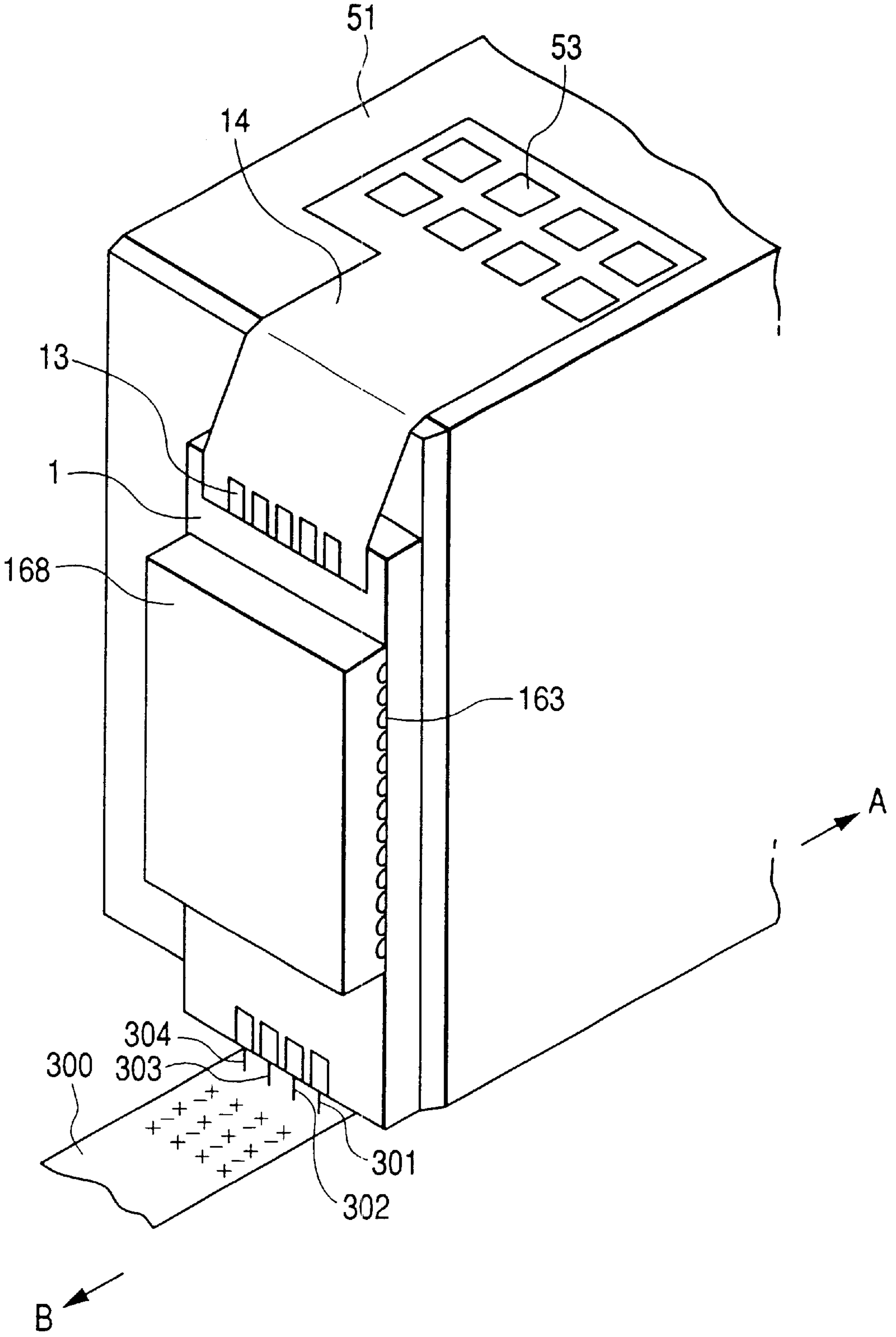
FIG. 17 is a perspective view of a recording head having a recording head substrate according to a seventh embodiment of the present invention.

FIG. 17 is a perspective view of a recording head that includes a recording head substrate according to a seventh embodiment of the present invention. The same reference numerals as were used for the sixth embodiment are also used in this embodiment to denote corresponding components. Only those portions that differ from the sixth embodiment will be described.

In this embodiment, as is shown in FIG. 17, electrostatic sensors are employed as head position detecting elements. Electrostatic detecting elements 301 to 304 are mounted by using a semiconductor layer of an element substrate 1 on which are mounted energy generating elements (electro-thermal converting elements). The electrostatic detecting elements 301 to 304 are not covered with a top board 168, and are arranged in a perpendicular direction relative to a row of discharge ports 163. In addition, the recording head in this embodiment can reciprocate in a vertical direction relative to the element substrate 1 and perpendicular relative to the row of discharge ports 163 (directions indicated by arrows A and B in FIG. 17). The electrostatic detecting elements 301 to 304 are positioned opposite, with an intervening gap, a linear charged member 300 (a charged member in which a positive charge and a negative charge are alternately arranged linearly), which is fixed along the direction of movement of the recording head.

As in the sixth embodiment in FIG. 16, four charged patterns that correspond to the electrostatic detecting elements 301 to 304 are provided for the linear charged member 300. The charging pattern is magnetized as a positive charge and a negative charge at pitches D. The charged patterns are charged by shifting from an adjacent charged pattern a distance equivalent to pitch D/4. Therefore, the detection accuracy of the electrostatic detecting elements 301 to 304 in the head moving directions A and B is D/4. That is, an extremely high detection accuracy can be obtained in consonance with the number of electrostatic detecting elements and the pitches of the electrostatic detecting elements, and the corresponding charged patterns.

In the fourth to the seventh embodiments, the head position detecting elements for employing magnetic force, light or an electric field to detect the position of a head after it is moved are mounted on the substrate on which the energy generating element is formed. However, light-receiving elements, such as CCDs that optically read a variety of information, such as the positions, the sizes and the densities of image dots that form an image, may be mounted with the energy generating elements and the head position detecting elements.

(Other Embodiment)

Figure 18:
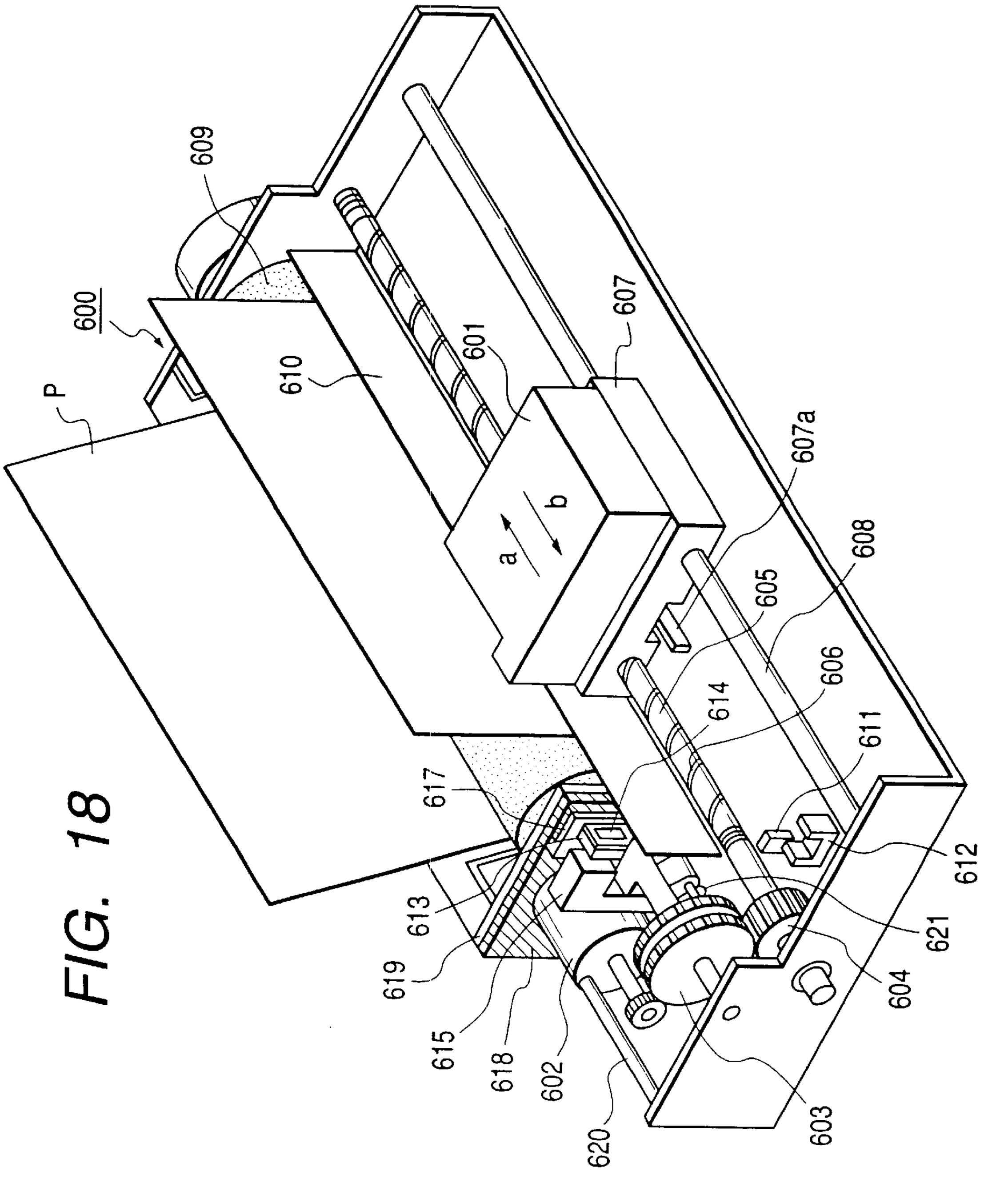
FIG. 18 is a schematic perspective view of an example of an ink jet recording apparatus in which the recording head according to one of the fourth to the seventh embodiments can be mounted.

FIG. 18 is a schematic perspective view of an ink jet recording apparatus that employs the recording head according to each of the above embodiments. In FIG. 18, the ink jet and the ink tank recording head according to each embodiment are integrally formed to provide an ink jet head cartridge 601. The ink jet head cartridge 601 is mounted on a carriage 607, which engages a spiral groove 606 of a lead screw 605 that, in accordance with the forward/backward rotation of a drive motor 602, is rotated via drive force transmission gears 603 and 604. With the carriage 607, the head cartridge 601 is moved, by the power produced by the drive motor 602, along a guide 608 in the directions indicated by arrows a and b. When a print sheet P is fed around a platen roller 609 by a recording medium supply apparatus (not shown), a paper holding plate 610 presses the print sheet P against the platen roller 609 in the direction in which the carriage 607 is moved. A linear magnetic member, a linear reflective member or a linear charged member, which is one part of the head position detection means, is provided for the paper holding plate 610 in consonance with the recording head described in each of the above embodiments.

Photocouplers 611 and 612 are located in the vicinity of one end of the lead screw 605. These are home position detection means for confirming the presence in this area of a lever 607*a* belonging to the carriage 607, and for changing the rotational direction of the drive motor 602. In FIG. 18, a support member 613 supports a cap member 614 that covers the front face of the ink jet recording head 601 in which discharge ports are formed. Ink suction means 615 absorbs ink that is pre-discharged through a recording head 601 and is retained in the capping member 614. The suction means 615 performs a suction recovery process for the head 601 via the open portion in the cap. A moving member 618 moves a cleaning blade 617 to the front or to the rear (in a direction perpendicular to the direction in which the carriage 607 is moved). The cleaning blade 617 and the moving member 618 are supported by a support member 619. The cleaning blade 617 is not limited to this form, and another well known type may be employed. A lever 620 is used to start the suction for the suction recovery operation. The lever 620 is moved in association with the movement of a cam 621 that engages the carriage 607, and the drive force exerted by the drive motor 602 is controlled by a well known transmission means, such as a clutch switching means. Since an ink jet recording controller, for transmitting a signal to a heat-generating member 202 that is provided for the head 601 or for controlling the above described sections, is provided for the main body of the apparatus, it is not shown in FIG. 18.

In an ink jet recording apparatus 600 having the above arrangement, when recording the head 601 is moved back and forth across the entire width of a recording sheet P, which is fed around the platen 609 by a recording medium supply apparatus (not shown).

The entire system arrangement of the apparatus will now be described while referring to FIG. 19.

Figure 19:
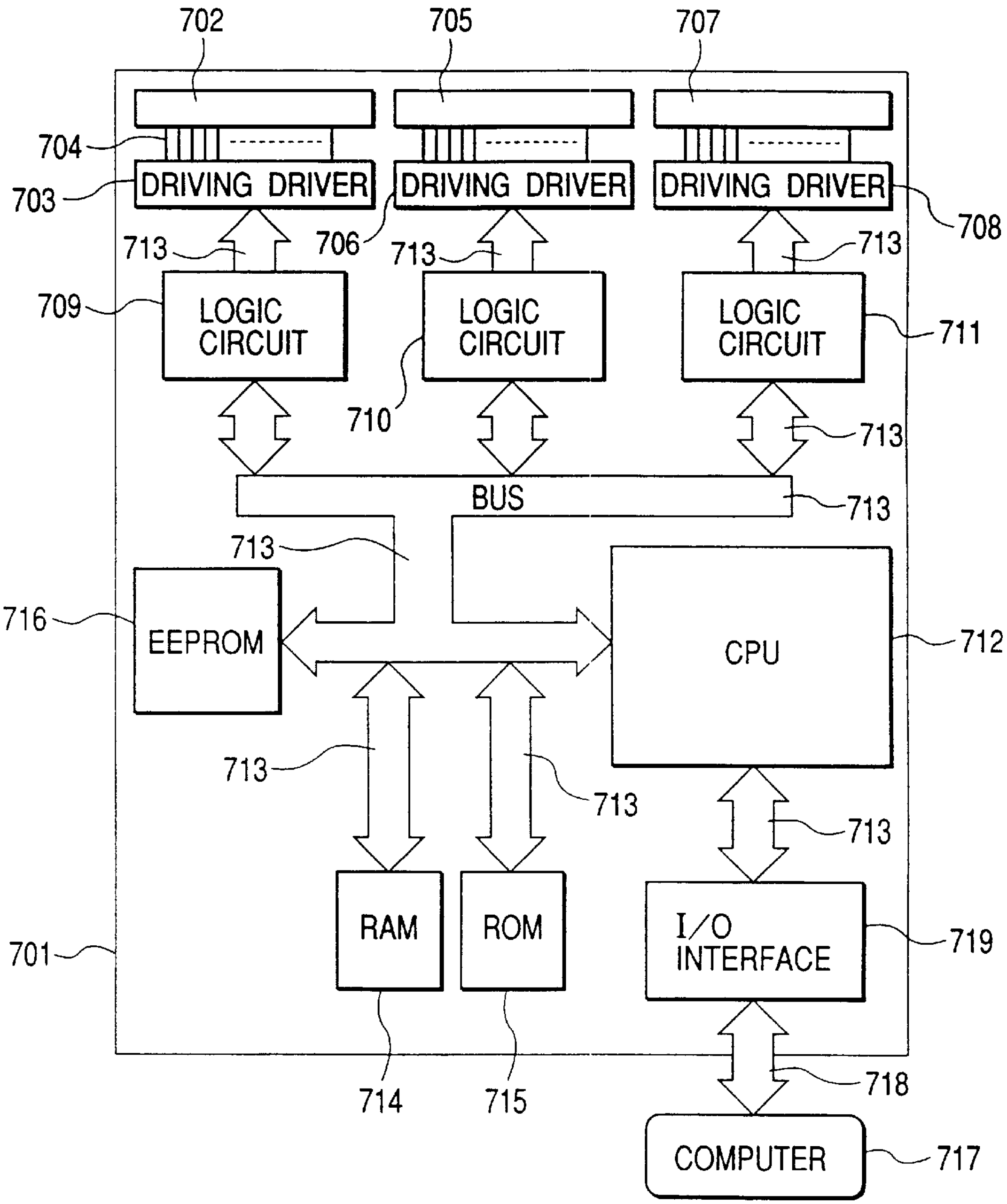
FIG. 19 is a specific diagram showing the general system structure of an ink jet recording apparatus according to the present invention.

As is shown in FIG. 19, in the apparatus, energy generating elements 702, for forming image dots, and drivers 703 are connected by a plurality of lines 704. Similarly, head position detecting elements 705 and a driver 706, the same as those in the above described embodiments, are connected by lines, as are light-receiving elements 707, for obtaining image information, and a driver 708. Further, these drivers are connected via logic circuits 709, 710 and 711 to a CPU 712. A bus 713 is employed for these connections, and a RAM 714, a ROM 715 and an EEPROM 716 are connected to the bus 713. Image information from a computer 717 is transmitted via a data cable 718 and an I/O interface 719 to the CPU 712, and is temporarily stored in the RAM 714. The positioning information for the individual elements is stored in the EEPROM 716.

As is described above, according to the present invention, since at the least energy generating elements and elements for detecting the position of a recording head are mounted on the same substrate, the following effects are obtained:

(1) an image can be recorded at a high position accuracy; and (2) since elements having at least two functions can be formed on the same substrate at the same time during the semiconductor processing, the manufacturing costs are extremely low. Similarly, when a plurality of heads are employed, the same method can be employed to accurately detect the positions of the heads, and to accurately correct the head positions.

What is claimed is:

1. A liquid discharge recording head comprising:

a discharge port face, having a discharge port for discharging liquid;

a substrate, having an energy generating element for generating energy for discharging the liquid from said discharge port, and having a liquid path for leading to said discharge port liquid to be discharged from said discharge port;

a light-emitting element and a light-receiving element formed in said substrate;

an irradiation lens and a light receiving lens provided to said discharge port face; and an optical fiber placing said light-emitting element in communication with said irradiation lens and an optical fiber placing said light-receiving element in communication with said light-receiving lens, wherein each of said optical fibers is curvedly disposed to change a direction of light paths of irradiation light and of received light.

2. A liquid discharge recording head according to claim 1, wherein a face of said substrate where said energy generating element is disposed and said discharge port face have a positional relation intersecting with each other.

3. A liquid discharge recording head according to claim 1, wherein said light-emitting element and said light-receiving element are formed in a face of said substrate, and that face and the face of said discharge port face have a positional relation intersecting with each other.

4. A liquid discharge recording head according to claim 3, wherein said face of said substrate is provided with said energy generating element.

5. A liquid discharge recording head according to claim 4, wherein said energy generating element, said light-emitting element and said light-receiving element are formed in said substrate during the same process step.

6. A liquid discharge recording head according to claim 1, wherein said energy generating element is an electrothermal converting member for applying thermal energy to the liquid.

7. A liquid discharge recording apparatus comprising:

a head mounting portion for mounting the liquid discharge recording head according to claim 1; and means for performing transmission and receipt of a signal with said light-emitting element and said light-receiving element of said liquid discharge recording head.

* * * * *